United States Patent Office 2,819,310
Patented Jan. 7, 1958

2,819,310

PRODUCTION OF VITAMIN A-ACTIVE MATERIAL

Howard C. Klein, Brooklyn, Charles O. Beckmann, Bayville, N. Y., and Kurt H. Schaaf, Newark, N. J., assignors to Nopco Chemical Company, Harrison, N. J., a corporation of New Jersey No Drawing. Application November 4, 1955
Serial No. 545,123

12 Claims. (Cl. 260—563)

This invention relates to the production of a compound having vitamin A activity which compound is highly useful as an intermediate for the production of vitamin A.

In U. S. patent application Serial No. 545,125 of Schaaf, Klein and Kapp, filed concurrently herewith, there is disclosed a procedure for producing a compound having vitamin A activity, which compound is highly useful as an intermediate in the production of vitamin A. This compound is referred to in the Schaaf, Klein and Kapp application as "Compound IV" and will be referred to herein as Compound IV.

Compound IV when tested biologically on rats shows a vitamin A activity of about 50%. Its ultra-violet spectrographic characteristics are practically identical with those of vitamin A; however, infra-red spectrographic analysis shows that Compound IV does not contain a hydroxyl group. Analysis of Compound IV discloses the presence of an N–H stretching band in the infra-red spectrographic curve of Compound IV indicating the presence in Compound IV of either a primary or a secondary amino group. Analysis of Compound IV by the Kjeldahl method shows that Compound IV has a nitrogen content of about twice the nitrogen content of the vitamin A amine (referred to hereafter as "vitamin A amine") wherein an amine group has replaced the hydroxyl group of vitamin A. The physical and chemical characteristics of Compound IV indicate that it contains the vitamin A chromophoric system wherein the hydroxyl group of vitamin A has been replaced by a basic fragment similar to a major portion of the hexamethylene tetramine molecule. It is a viscous liquid soluble in ethyl ether, ethyl alcohol, acetone and similar solvents. It has an absorption maximum in the ultra-violet at 3250 A. and has at that wave length an absorbance of $$E_{1\ cm}^{1\%} \cong 1000$$

If it is treated with hydrobromic acid, a product is obtained which has an absorption maximum at 3300 A. Likewise treatment of Compound IV with phosphoric acid gives a product having an absorption maximum at 3280–3300 A. Presumably salts of Compound IV are formed by the treatments with hydrobromic and phosphoric acids since treatment of the products with alkali gives in each case the original Compound IV having an absorption maximum at 3250 A. Acetylation of Compound IV with acetic anhydride gives a product which when analyzed by infra-red analysis shows the presence of an amide band in the infra-red spectrographic curve.

Although Compound IV does have vitamin A activity, its primary value is as an intermediate for the production of vitamin A. It can be converted to vitamin A amine by treating it with aluminum isopropoxide in accordance with the procedure disclosed and claimed in the copending application Serial No. 545,124 of Howard C. Klein, filed concurrently herewith. Also it can be converted to vitamin A aldehyde by treating it with iodine in accordance with the procedure disclosed and claimed in the copending application of Klein and Grassetti, Serial No. 545,122, filed concurrently herewith.

It is disclosed in the Schaaf, Klein and Kapp application referred to hereinabove that Compound IV can be prepared from a material having the empirical formula $C_{20}H_{30}O$, which compound contains the $\beta$-ionone ring structure, four ethylenic bonds and one hydroxyl group and which in the trans configuration has an absorption maximum in the ultra-violet at 2710 A., a molecular extinction coefficient at that wave length of 29,100 and has a refractive index at 20° C. of about 1.552, and which in the cis configuration has an absorption maximum in the ultra-violet at 2740 A., a molecular extinction coefficient of 25,900 and has a refractive index at 160° C. of about 1.535. This compound, both the cis and the trans form of it, is referred to in the Schaaf, Klein and Kapp application as "Compound I" and will be so referred to herein.

Compound I has the following structural formula:

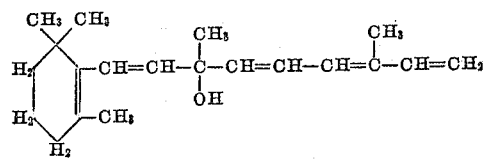

Compound I

In the Schaaf, Klein and Kapp application it is disclosed that Compound IV may be prepared by treating either the cis or the trans form of Compound I with boron trifluoride hexamethylene tetramine complex under appropriate reaction conditions in a water-containing aromatic hydrocarbon solvent solution. This procedure gives yields of Compound IV in the neighborhood of 30%. When this procedure is carried out at room temperature a reaction time in the neighborhood of approximately 40 hours is usually employed.

It is the object of this invention to provide an improved procedure for producing the vitamin A-active material referred to herein as Compound IV.

Other objects of this invention will in part be obvious and will in part appear hereinafter.

The above and other objects of the invention are accomplished by reacting Compound I with boron trifluoride hexamethylene tetramine complex under appropriate reaction conditions in a solvent selected from the group consisting of acetone, acetonitrile, acrylonitrile, benzyl cyanide, dioxane, isopropenyl acetate, tetrahydrofuran and mixtures of such solvents. The preferred solvent is dioxane containing a small amount of water.

By carrying out the reaction between Compound I and the boron trifluoride hexamethylene tetramine complex in the solvents given above, it is possible to obtain much higher yields than by the procedures disclosed in the copending application of Schaaf, Klein and Kapp and to accomplish the desired reaction in a much shorter period of time than in the procedure of the Schaaf, Klein and Kapp application. Since the ultra-violet absorption maximum for Compound I is at 2710 A. for the trans form of Compound I and at 2740 A. for the cis form of Compound I whereas the ultra-violet absorption maximum for Compound IV is at 3250 A., the course of the reaction can readily be followed by ultra-violet spectrographic analysis. Thus as the reaction proceeds the absorption peak at 3250 A. will gradually increase and at the same time the absorption peak at 2710 A. or 2740 A., depending on whether the trans or cis form of Compound I has been employed, will gradually diminish and on completion of the reaction will disappear. Thus it can readily be determined how long a reaction time will be required for any given set of reaction conditions.

The hexamethylene tetramine complex of boron trifluoride which we employ is one in which the ratio of boron trifluoride to hexamethylene tetramine varies from an average of about 1.5 to an average of about 2.5 molecules of boron trifluoride to each molecule of hexamethylene tetramine. Complexes containing larger or smaller ratios of boron trifluoride are not nearly as satisfactory for use in our process as complexes containing our preferred ratios of boron trifluoride. Preferably we employ a complex containing an average of about 2 molecules of boron trifluoride for each molecule of hexamethylene tetramine. In carrying out the reaction we have found that the boron trifluoride complex does not act in the normal catalytic sense. Thus in order to obtain the most satisfactory results when using a complex containing about 2 molecules of boron trifluoride for each molecule of hexamethylene tetramine, it is necessary that the boron trifluoride complex be employed in at least about a mole to mole ratio in proportion to the amount of Compound I which is used in the reaction. Although ratios of less than one to one will produce some Compound IV, by far the best results are obtained when at least about a one to one ratio is employed. Ratios greater than one to one can be used, if desired, but normally there is no substantial advantage in using such higher ratios. When the ratio of boron trifluoride to hexamethylene tetramine in the complex is decreased, the mole ratio of the complex to Compound I is preferably increased a corresponding amount. Also when the ratio of boron trifluoride to hexamethylene tetramine in the complex is increased, the mole ratio of the complex to Compound I can be correspondingly decreased, if desired, although it is not necessary to do so. In all cases the amount of the boron trifluoride hexamethylene tetramine complex which is employed should be sufficient to provide at least about two molecules of boron trifluoride for each molecule of Compound I.

Since both Compound I and Compound IV are relatively susceptible to oxidation, it is preferred that the reaction be carried out in an inert atmosphere such as an atmosphere of nitrogen, helium or some other inert gas.

The temperature at which the reaction is carried out can be varied. Preferably, however, the temperature should be between about room temperature and about 35° C.; however, if desired, either lower or higher temperatures can be employed. We have found that at room temperature the reaction will normally proceed to completion in not more than about three hours and in many instances will proceed to completion in from fifteen to thirty minutes.

As pointed out above, the preferred solvent is dioxane containing a small amount of water. Since water forms a complex with boron trifluoride, it might be thought that the presence of water in the reaction mixture would inactivate the boron trifluoride hexamethylene tetramine complex. We have found, however, that water does not inactivate the boron trifluoride hexamethylene complex. Preferably when dioxane is the solvent, water is added to the reaction mixture to increase the polarity of the solvent since the reaction appears to proceed more efficiently in a highly polar solvent. Thus from about 1% to 10% of water based on the volume of the dioxane is preferably employed. Also, if desired, water can be used in the reaction medium when solvents other than dioxane are employed.

Preferably we employ rather dilute solutions of Compound I in carrying out the conversion of Compound I to Compound IV. Thus in most cases a concentration of from about 0.1 g. to about 1 g. of Compound I is present for each 100 ml. of the reaction mixture.

On completion of the reaction between Compound I, and the boron trifluoride hexamethylene tetramine complex, there is added to the reaction mixture an excess of an organic or inorganic basic material, i. e. an amount sufficient to react with all of the boron trifluoride in the reaction mixture. The basic material is preferably added in an aqueous solution; however, other means of adding the basic material, such as in alcoholic solution, may be used if desired. Bases such as ammonia, sodium hydroxide, potassium hydroxide, trimethylamine, ethanolamine and similar inorganic or organic bases may be employed. The type or nature of the basic material which is added is not critical except that it must be capable of displacing the hexamethylene tetramine from the boron trifluoride hexamethylene tetramine complex. Preferably a basic material whose dissociation constant is greater than that of hexamethylene tetramine is employed. The basic material is added in order to separate the boron trifluoride from the product produced by the reaction of Compound I with the boron trifluoride hexamethylene tetramine complex. After the treatment of the reaction mixture with the basic material, Compound IV is present in the reaction mixture free of the boron trifluoride. Compound IV may then be readily recovered from the reaction mixture by any suitable means, for example, if the basic material was added in an aqueous solution, extraction of the reaction mixture with hexane will remove the Compound IV from the reaction mixture in pure form.

For a fuller understanding of the invention, reference may be had to the following examples which are given merely as further illustrations of the invention and are not to be construed in a limiting sense:

Example I 0.050 g. of the trans form of Compound I was dissolved in 14.75 ml. of dioxane and to the resulting clear solution there was added 0.050 g. of boron trifluoride hexamethylene tetramine complex in 0.25 ml. of water, said complex containing an average of about 2 molecules of boron trifluoride for each molecule of hexamethylene tetramine. The mixture thus formed was allowed to stand for three hours with intermittent shaking at room temperature in an atmosphere of nitrogen. Compound IV was then obtained from the reaction mixture by adding an excess of 5% aqueous ammonia, i. e. sufficient to give the reaction mixture an alkaline pH, and then extracting the reaction mixture with hexane. The hexane extracts were washed to neutrality with water, dried over $Na_2SO_4$, filtered and evaporated to dryness to give Compound IV. Compound IV had been formed in a yield of 67% as indicated by ultra violet spectroscopic analysis. On infrared analysis the presence of an amine band was observed. Upon acetylation of Compound IV an amide band was observed in the infra-red spectrum of the acetylated derivative.

Example II

Two procedures were carried out using the same quantities of ingredients and the same conditions as were employed in Example I except that in one procedure (identified as A) acetone was substituted for the dioxane employed in Example I and in the other procedure (identified as B) acetone was substituted for the dioxane employed in Example I and the water present in Example I was omitted. In Procedure A a yield of 53% of Compound IV was obtained after only one minute and in Procedure B a yield of 53% of Compound IV was obtained after 15 minutes.

Example III

In this example two procedures were carried out using the quantities of ingredients and conditions employed in Example I except that in one procedure (identified as C) the dioxane employed in Example I was replaced by tetrahydrofuran and in the other procedure (identified as D) tetrahydrofuran was employed as the solvent and in addition the reaction was carried out at 0° C. instead of at room temperature. In Procedure C it was found that a yield of 42% of Compound IV was obtained after one hour. In Procedure D it was found that at the end of 20 hours a yield of 25% of Compound IV was obtained.

Example IV

The procedure of Example I was repeated employing acetonitrile as the solvent in lieu of the dioxane used in Example I. At the end of 15 minutes a yield of 33% of Compound IV was obtained.

Example V

In this example three reactions were carried out employing acrylonitrile as the solvent in place of the dioxane employed in Example I. In the first procedure (identified as E) the same conditions were employed as were employed in Example I. The second procedure (identified as F) omitted the water included in the reaction system of Example I, while the third procedure (identified as G) varied from the conditions employed in Example I in that it was carried out at a temperature of −10° C. It was found that Procedure E returned a yield of 41% of Compound IV in 5 minutes; Procedure F provided a yield of 39% of Compound IV after 30 minutes; and Procedure G returned a yield of 40% of Compound IV after 30 minutes.

Example VI

In this example isopropenyl acetate was substituted for the dioxane employed in Example I and the reaction was conducted in the absence of water. After one minute it was found that a yield of 36% of Compound IV was obtained.

Having described our invention, what we claim as new and desire to secure by Letters Patent is:

1. A process for producing a vitamin A-active material which comprises reacting a boron trifluoride hexamethylene tetramine complex containing an average of from about 1.5 to about 2.5 molecules of boron trifluoride for each molecule of hexamethylene tetramine with an organic compound having the empirical formula $C_{20}H_{30}O$ and having the structural formula

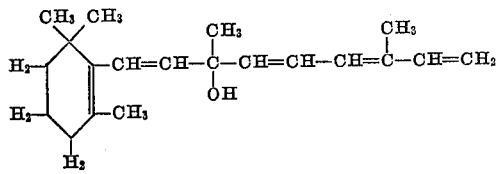

which compound contains the beta ionone ring structure, four ethylenic bonds and one hydroxyl group, and which in the trans form has an absorption maximum in the ultra-violet at 2710 A., molecular extinction cofficient at that wave length of 29,100 and has a refractive index at 20° C. of about 1.552, and which in the cis form has an absorption maximum in the ultra-violet at 2740 A., a molecular extinction coefficient at that wave length of 25,900 and has a refractive index at 16° C. of about 1.535, said reaction being carried out in a polar solvent selected from the group consisting of acetone, acetonitrile, acrylonitrile, benzyl cyanide, dioxane containing a small amount of water, isopropenyl acetate and tetrahydrofuran employing an amount of the boron trifluoride hexamethylene tetramine complex sufficient to provide at least about 2 molecules of boron trifluoride for each molecule of the organic compound; and thereafter adding to the reaction mixture an amount of an alkaline material sufficient to react with all of the boron trifluoride in the reaction mixture.

2. The process of claim 1 wherein the polar solvent contains from about one percent to ten percent of water by volume based on the volume of the solvent.

3. The process of claim 2 wherein the solvent is dioxane.

4. The process of claim 1 wherein the reaction is carried out at a temperature between about room temperature and about 35° C.

5. The process of claim 1 wherein the concentration in the solvent of the organic compound having the empirical formula $C_{20}H_{30}O$ varies from about 0.1 g. to about 1 g. of organic compound for each 100 ml. of the reaction mixture.

6. The process of claim 5 wherein the reaction is carried out at a temperature between about room temperature and about 35° C.

7. The process of claim 2 wherein the reaction is carried out at a temperature between about room temperature and about 35° C.

8. The process of claim 7 wherein the concentration in the solvent of the organic compound having the empirical formula $C_{20}H_{30}O$ varies from about 0.1 g. to about 1 g. of organic compound for each 100 ml. of the reaction mixture.

9. The process of claim 1 wherein the boron trifluoride hexamethylene tetramine complex contains an average of about 2 molecules of boron trifluoride for each molecule of hexamethylene tetramine.

10. The process of claim 2 wherein the boron trifluoride hexamethylene tetramine complex contains an average of about 2 molecules of boron trifluoride for each molecule of hexamethylene tetramine.

11. The process of claim 1 wherein said

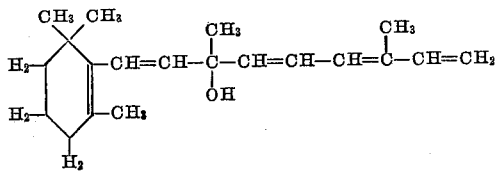

and boron trifluoride complex are present in at least about a mole to mole ratio.

12. A process for producing vitamin A active material which comprises reacting a boron trifluoride hexamethylene tetramine complex containing about 2 molecules of boron trifluoride per molecule of hexamethylene tetramine with about equimolecular quantities of an organic compound,

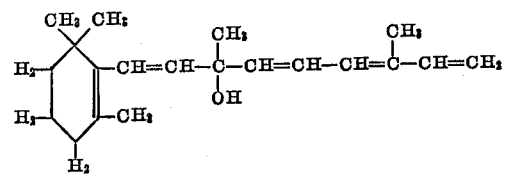

at room temperature for about one minute to three hours in the presence of a polar solvent selected from the group consisting of acetone, acetonitrile, acrylonitrile, benzyl cyanide, dioxane containing a small amount of water, isopropenyl acetate and tetrahydrofuran, said organic compound being present in a concentration of about 0.1 gram to about 1 gram for each 100 ml. of reaction mixture, and thereafter adding to the reaction mixture an amount of alkaline material sufficient to react with all of the boron trifluoride in the reaction mixture.

No references cited.